March 6, 1956

R. H. THORNER 2,737,165

GOVERNOR DEVICE

Filed March 21, 1951

INVENTOR.
ROBERT H. THORNER
BY
Gregory S. Dolgorukov
ATTORNEY.

March 6, 1956 R. H. THORNER 2,737,165
GOVERNOR DEVICE

Filed March 21, 1951 4 Sheets-Sheet 2

INVENTOR.
ROBERT H. THORNER
BY
Gregory S. Dolgorukov
ATTORNEY

March 6, 1956

R. H. THORNER 2,737,165

GOVERNOR DEVICE

Filed March 21, 1951

INVENTOR.
Robert H. Thorner
BY
Gregory S. Dolgorukov
ATTORNEY.

United States Patent Office 2,737,165
Patented Mar. 6, 1956

2,737,165

GOVERNOR DEVICE

Robert H. Thorner, Detroit, Mich.

Application March 21, 1951, Serial No. 216,821

37 Claims. (Cl. 123—103)

This invention relates to internal combustion engines, and more particularly to an improved internal combustion engine of the two-stroke cycle type, having means governing variable performance factor or factors of said engine, such for instance as speed. The invention is particularly, but not exclusively, advantageous in application to diesel engines of the foregoing type. The present invention is a continuation in part of my co-pending applications Serial No. 77,839 filed February 23, 1949 for Governor Mechanism and now abandoned; Serial No. 14,282, filed March 11, 1948 for Engine Governor, now Patent No. 2,661,728 issued December 8, 1953; and Serial No. 59,109 filed November 9, 1948 for Engine Governor.

The necessity of controlling various performance factors of diesel engines of the above type, particularly the speed thereof, is an important requirement in practical use of such engines. However, provision in such engines of reliable governing means and particularly of speed governing means presents a difficult problem due to a number of mutually exclusive and contradictory requirements which, if satisfied in a single device, make its construction undesirably complicated and expensive, or its operation not fully reliable. With respect to governing speed of diesel engines, it has been found necessary to create a force which would vary as a function of the speed of the engine and then use the same force to effect movements of a control member, such as a fuel pump rack, to govern the speed of the engine. Creating the required force is usually effected with the aid of so-called centrifugal governors including weights driven by the engine and bodily revolving at angular speed proportional to the speed of the engine.

While devices of this nature have been used in connection with engines for a number of years, there is a number of serious disadvantages in their use, which disadvantages are well appreciated by those skilled in the art. In the first place, provision of a separate rotating mechanism of a relatively complicated construction and means of driving the same, complicates construction of the engine, increases its cost, and makes maintenance more difficult and costly. Insufficient sensitivity of governors manifesting itself in slow response, surging, hunting, and the resulting instability of the governed engines are further examples of such disadvantages particularly pronounced at lower engine speeds.

One of the objects of the present invention is to provide an improved governor for an internal combustion engine in which disadvantages of conventional constructions are overcome and largely eliminated and in which the desired speed control is effected in an improved manner.

A further object of the invention is to provide an improved governor for an internal combustion engine in which the desired speed control is attained without providing a special device for creating a force varying in accordance with the speed of the engine, and without providing a special drive for such a device, thus reducing the number of parts and rendering the engine more dependable and its maintenance less costly.

A still further object of the present invention is to provide an improved governor for an internal combustion engine of the character specified in the preceding paragraph, in which the final control member is actuated in response to and as a function of the speed of the engine.

A still further object of the present invention is to provide an improved governor for an internal combustion engine having a charging blower, said governor having improved speed controlling means in which instability, hesitation or hunting, low sensitivity and similar deficiencies in performance are eliminated.

A still further object of the present invention is to provide an improved governor for an internal combustion engine of the type specified above having means whereby its speed is controlled in a dependable, consistent and stable manner throughout the entire range of engine speeds, including the low speeds thereof.

A still further object of the present invention is to provide an improved governor for an internal combustion engine of the type specified, which governor includes a substantially frictionless servovalve or modulator valve, whereby virtually instantaneous response of the governor to changed condition, elimination of its hesitation and hunting, and stable operation of the engine are attained.

A still further object of the present invention is to provide an improved governor for an internal combustion engine of the type specified utilizing the pressure in the scavenging air box of the engine as sensing factor or faculty, means being provided to compensate for the effect on the controlled engine speed of changes in air density resulting from changes in altitude and/or temperature of the air.

It is an added object of the present invention to provide an improved governor for an engine of the foregoing character, which is simple and rugged in construction, dependable in operation, and is relatively inexpensive to manufacture and to service.

Further objects and advantages of the invention will be apparent from the following description, taken in connection with the appended drawings, in which.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the invention as applied to a diesel engine of the two-stroke cycle type, I utilize as a speed-sensing faculty or factor the pressure produced by the air pump or blower, which pressure varies as a function of the speed of the engine. Since said pressure may not be sufficient or dependable to actuate a control member directly by itself, I utilize, in my preferred form, as actuating or operating pressure for the control member the pressure of a separate fluid circuit having any desired intake and discharge pressures, and controlled by said "sensing" pressure. In order to effect the desired control, in the preferred form, I interpose in such fluid circuit a modulator valve adapted, when actuated through its predetermined range of travel, to modulate or to vary said actuating pressure throughout a range of intermediate pressures all the way from the intake pressure to the discharge pressure in said circuit. For proper operation the fluid circuit should have at least two restrictions with at least one of said restrictions being variable. I prefer, however, to use two restrictions with both being variable in a coordinated manner, such as by the use of two valves secured together for common movement. As one valve portion of such combined valve moves to close one restriction, the other valve portion moves to open the other restriction and thus to increase the effect of movement of the first valve portion on the static pressure in the circuit between the restrictions. It should be appreciated at this point that passages forming the circuit should have sufficient cross section and not be in themselves restrictive on the flow of fluid therethrough. I subjugate the modulating movements of such combined valves to the sensing pressure by actuating the modulator valve with the aid of a diaphragm or similar substantially frictionless means responsive to the sensing pressure. I use the "operating" pressure to actuate a pressure-responsive member, such as a piston, connected to the final control member, in the present embodiment the member controlling the speed of the engine, such for instance at the rack controlling the length of the stroke of the engine fuel pump.

By virtue of such a construction the speed-sensing pressure, which may vary through a very small range of pressures, is amplified in any desired degree or manner to produce operating pressure of any desired intensity and producing any required volume of transfer or flow of the operating fluid. This, in turn, enables me to produce controlling forces of any desired magnitude and acting through any desired distances, insuring proper operation of the engine control members.

According to the foregoing inventive concept in its broadest essential terms, a governor is provided which does not require a separate and costly driving element designed and built in the engine and costly and complex engine-driven means in the governor itself. This undesirable requirement is avoided in the present invention by utilizing means inherent in the engine and rotating as a function of engine speed to blow air. The governor includes a pressure responsive member connected to be subject to a pressure which is a function of the pressure produced by the air-blowing means and varying as a function of the speed of the air blowing means. In the forms shown herein, the pressure responsive member (which actuates the modulating pilot valve) is subject to the pressure of the intake manifold and to the static pressure therein varying as a function of engine speed. It is within the scope of the inventive concept, which eliminates the need for separate engine-driven elements, that any air blowing means driven by the engine (and a part thereof) may be used to produce the pressures acting on the pressure responsive member and varying as a function of engine speed.

While it is advantageous to utilize as speed-sensing pressure ("brain" pressure) the charging air pump or other fluid pressure already available in an engine, under some conditions it may be desirable to provide a special source of such a pressure. For producing operating pressure any available fluid under pressure, dependent or independent of the engine speed, may be used to produce a fluid circuit. As a modified expedient, the sensing pressure itself may be used to produce such an operating circuit.

While various pressure-responsive means may be used for actuating the modulator valve, use of a diaphragm, bellows, or a disc is preferred due to sensitivity characteristics thereof in short stroke movements. For operating the engine controlling members, where relatively long movements are required, use of piston, long-stroke diaphragm, or like means is advantageous.

Improved means are provided for suspending the modulator valve to reduce greatly and virtually eliminate any frictional resistance to its operative movements, thereby insuring instantaneous response of the valve, facilitating assembling and disassembling of the valve mechanism, insuring its quick and easy positioning in proper functional alignment, and preventing disturbance of such alignment in operation. Use of such frictionless suspension means is of extreme importance, and it may be critical in most installations to which the present invention relates. Use of such suspension means is of a particularly critical importance in constructions wherein the "sensing" pressure is small. Such a leaf-spring-suspended pilot valve in operative combination with the substantially frictionless pressure-responsive valve-actuating member and the frictionless means biasing the pressure-responsive member provides a substantially frictionless "sensing-mechanism" which must respond to the small "sensing" pressure in the intake air passage produced by a small change in speed.

In order to compensate for the effect of changes in air density produced by temperature variations, I use in one form a modulator valve suspension spring of bimetallic construction, to effect in a desired manner the modulating positions of the valve. Similarly, sealed bellows are used to compensate for the effects of changes in air density produced by changes in altitude, and can also be made responsive to temperature effects.

While the invention is illustrated and described with reference to a two cycle diesel engine, it will be understood that it is not limited thereto, and may be used with an equal success with any engine having a source of air pressure varying as a function of the speed of the engine.

Figure 1:
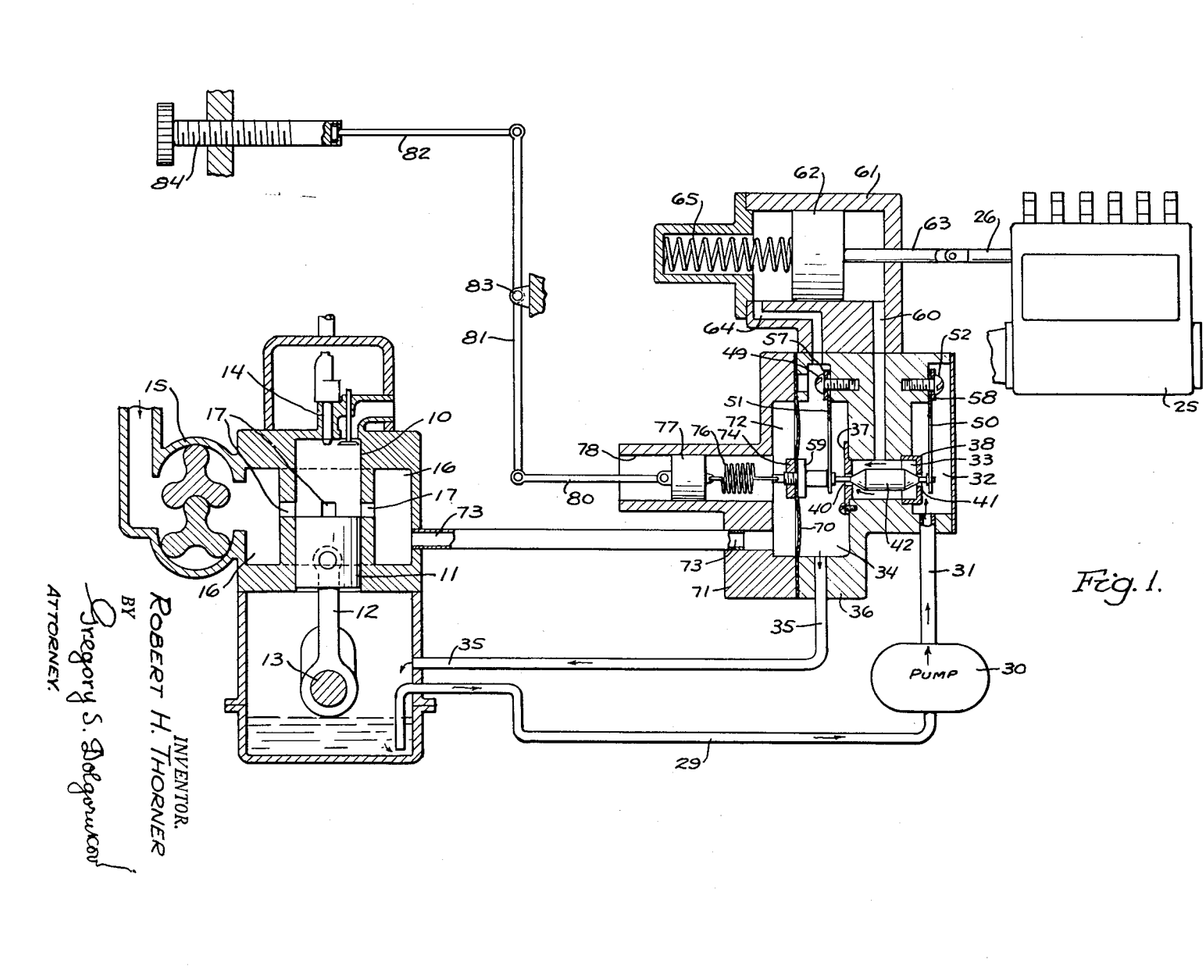
Fig. 1 is a sectional view illustrating (diagrammatically in part) a governor embodying the present invention, applied to a two-stroke cycle engine of the diesel type.
Figure 2:
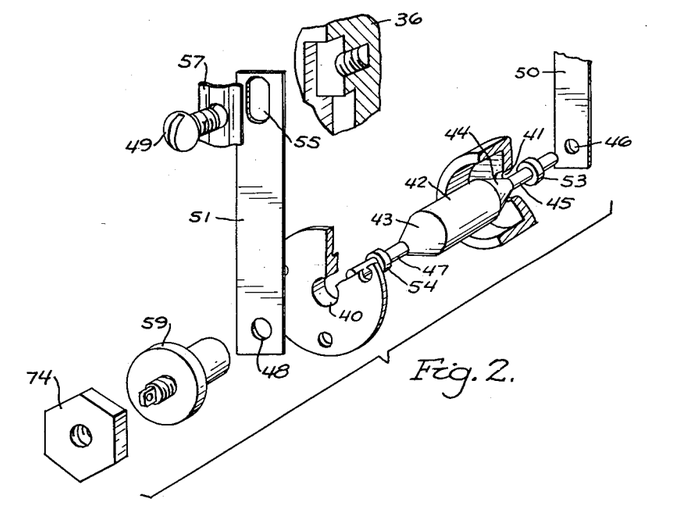
Fig. 2 is an exploded view illustrating suspension means for the modulator or pilot valve automatically modulating the fluid pressure actuating the engine control member.
Figure 3:
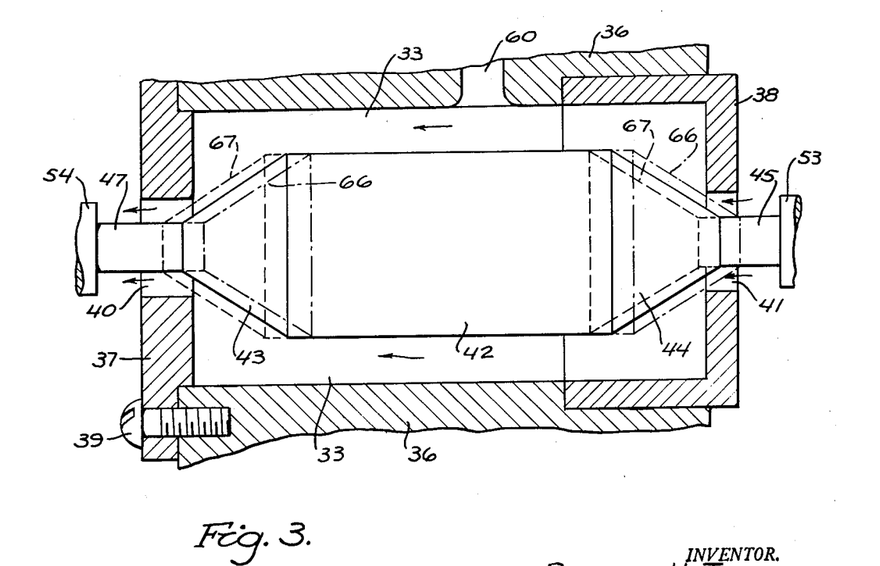
Fig. 3 is a view illustrating on a larger scale the modulator valve and the chamber in which it is suspended for operation.

In the drawings there are shown by way of example diesel engines of the two-stroke cycle type, embodying the present invention. Referring particularly to Figs. 1-3, the diesel engine illustrated therein comprises a cylinder 10 in which there is slidably fitted a piston 11 having a connecting rod 12 operatively associated with the crankshaft 13. Fuel injection means 14 and exhaust valve are provided at the top of the cylinder 10 in a manner well known in the art. An air pump or blower 15 driven by the engine is provided, as shown. The blower 15 delivers air into an air box 16 surrounding the cylinder 10. A plurality of ports 17 lead from the air box 16 into the lower portion of the cylinder 10.

A fuel injection pump 25 which may be of any suitable construction has a fuel metering rack 26 provided therein. The rack 26 constitutes the speed controlling member of the engine. Moving the rack 26 to the right reduces the amount of the fuel discharged through the fuel injector 14, reducing the speed of the engine. Moving the rack 26 to the left increases the amount of fuel discharged through the injector 14, thus increasing the speed of the engine.

The structure so far described is conventional; its construction and operation are well known in the art and therefore need not be described in further detail. It will suffice to mention that the first portion of the downward stroke of the piston is a working portion of the stroke. As the piston reaches the second portion of its downward travel, the exhaust valve opens, permitting a part of the exhaust gases to escape. Near the end of the downward stroke of the piston the air ports 17 are uncovered, and the air under pressure from the air box 16 enters the cylinder pushing out the exhaust gases. As the piston starts on its upward stroke, the ports 17 are covered, and further upward movement of the piston operates to compress the air. Near the upper dead center of the piston, fuel is injected into the cylinder, and ignition takes place, starting the piston on its downward travel.

It have found that the air pressure in the box 16 varies as a function of the speed of the engine. Thus, in accordance with the invention, the air pressure in the box 16 qualifies as a speed sensing faculty or factor for controlling the engine. However, in accordance with the invention, said pressure may not qualify as suitable power pressure for directly actuating the speed controlling member of the engine, the metering rack 26 in the present embodiment. Such pressure is particularly unsuitable at the lower speeds of the engine, where its changes are inadequate to insure proper control of the engine. It is at such speeds that the box air pressure particularly requires amplification.

In accordance with the invention a fluid circuit is provided to produce the required "operating" pressure for actuating the piston connected to the metering rack 26. In the construction of Fig. 1, such a circuit comprises a source of fluid pressure in the form of the engine oil pump 30 with a conventional pressure relief valve (not shown), a discharge conduit 31, a chamber 32, a valve chamber 33, a chamber 34, and a conduit 35 leading to the engine crankcase, and the intake conduit 29 of the oil pump 30. The valve chamber 33 is formed by a recess or bore provided in the body 36 and end pieces 37 and 38 closing the ends of the bore. The end piece 37 is connected to the body 36 in any suitable manner, such as with the aid of screws 39, while the end piece 38 is pressed into the bore. End pieces 37 and 38 have valve orifices or openings 40 and 41, respectively, provided therein.

Within the chamber 33 there is suspended in a manner described in detail below, a combined modulator or pilot valve 42 having valve portions or faces 43 and 44 provided on its ends and adapted to cooperate with openings 40 and 41, respectively, to vary their effective areas through the range of areas from zero to their full effective areas. The stem 45 of the valve 42 extends through the opening 41 and is supported at the hole 46 provided in the leaf spring 50 secured to the body 36 with the aid of a screw 52. A shoulder 53 is provided on the stem 45 to bear against the leaf spring 50. A stem 47 having a shoulder 54 passes through the hole 48 of the leaf spring 51 secured to the body 36 with the aid of a screw 49.

The stems 45 and 47 are arranged co-axially with the openings 40 and 41 in order to insure proper and full seating of the valves for closing the openings. Means are provided to insure such arrangement of the valves in assembly. Such means are exemplified by the elongated holes 55 provided in the upper ends of the leaf springs 50 and 51, and anti-torque plates 57 and 58 at screws 49 and 52, respectively. It will be clear from an examination of the drawings, that the provision of the elongated holes 55 enables quick and easy locating of the valve body co-axially of the opening by first seating the valve in the end piece and thereupon tightening of the respective screw. The elongated hole or similar fastening clearance means, permits the valve faces 43 and 44 to seek any desired position in relation to their seats 40 and 41, respectively, after which the screws 49 and 52, respectively, are tightened. The anti-torque plates which fit into the body recesses and cannot rotate therein prevent direct contact between the screws and the leaf springs and the tendency of the screws in tightening to turn the springs and thus to disorganize the previously attained concentricity of valve positioning. The anti-torque plates are made of spring steel and are provided with a bead in order to produce a lock washer action at the screw in addition to its anti-torque action. Use of a lock washer and a flat plate may also be advantageous.

The end of the valve stem 47 protruding from the leaf spring 51 fits into a bore provided in the end of a diaphragm retainer 59 and is flash soldered thereon. However, any suitable means may be used to secure at least one leaf spring to the valve 42 to prevent rotation thereof. The diameter of said retainer end is approximately equal to that of the shoulder 54, and the leaf spring 51 is held between the shoulder 54 and the diaphragm retainer and is also soldered thereto, thus preventing rotation of the valve and making its seating more definite. An assembly is produced comprising the valve 42 positively secured to the leaf spring 51, with end-piece 37 fitting loosely between leaf spring 51 and valve face 43. This assembly is installed in the governor by first inserting the valve flange 53 and stem 45 through orifice 41 in end-piece 38. Then the screws 39 are tightened to secure end-piece 37 to the body 36. The leaf spring 50 with its anti-torque plate 58 is then loosely secured to the body 36 by screw 52 after first slipping the hole 46 of leaf spring 50 over the extension of stem 45 on the end of the valve 42; the hole 46 is made for a slipfit clearance with the extension of stem 45. The leaf spring 50 may be slightly pre-bent in its free position to the left, as viewed in Fig. 1, to provide an abutting contact of the leaf spring against shoulder 53 when screw 52 is tightened which straightens out the spring 50 as shown, but with a very slight leftward force on shoulder 53. This slight pre-bending of the spring 50 aids in maintaining the valve 42 in position whereby the leaf spring 50 will always follow movements of the valve, and further facilitates easy assembly of the unit by avoiding the additional complexity of positive securing means at this leaf spring suspension; however any suitable positive securing means may be employed if desired. Next, the leaf spring 51 and its anti-torque plate 57 are loosely secured in position by means of screw 49. Then the valve 42 is held manually to the right as viewed in Fig. 1, so face 44 seeks its seat in orifice 41 whereupon the screw 52 is tightened; similarly, the valve is next held manually to the left, so face 43 seeks its seat in orifice 40 whereupon screw 49 is tightened. For best results, the procedure is repeated a second time at each seat by holding the valve face tightly against its respective seat and then slightly loosening the corresponding screw and tightening again. The recess in the body 36, as shown best in Fig. 2, provides a rotary abutment for the anti-torque plate 57 as it tends to revolve due to the tightening action of the head of screw 49 whereby only thrust forces are transmitted to leaf spring 51 so that its position is not disturbed by tightening screw 49. As illustrated in this disclosure, the side walls of the recess for the anti-torque plate provides the rotary abutment, although if desired, the top wall of the recess may be employed equally well for this purpose. By virtue of such a construction the undesirable effects of various production imperfections, such as may occur in sizes of holes, their locations, eccentricity of round openings, and the like, are eliminated.

In actual operation, the combination of the elongated hole or similar means to permit universal movement of the valve, the anti-torque plate, and positive locking of the valve from rotary movement is capable of providing and maintaining substantially leak-proof valves, and of greater importance, substantially frictionless valve seating in all production units. Mis-alignment of the valve faces in relation to their seats in the end-pieces, as explained, could be produced by the torque of screws 49 and 52, or the leaf spring holes 55 and the threaded bores for screws 49 and 52, or if the valve can revolve in relation to the springs 50 and 51 wherein mis-alignment could be produced, for example, as a result of a slight bend in the valve due to machining stresses, which bend would produce eccentric movement upon rotation of the valve. Such mis-alignment of a valve face in relation to its seat would cause a wedging action wherein considerable static friction is produced to prevent the valve from instantly leaving its seat when required in the stabilizing process. This wedging action would occur since only one side of the valve would contact the seat, and the tapered form of the valve would further assist in producing the wedging action when the valve is at either extremity of travel. Such wedging action disrupts the inherent frictionless characteristics of the combination of the diaphragm or similar frictionless sensing member, the leaf-spring-suspended pilot valve, and the frictionless biasing spring 76, which combination must respond consistently to the minute changes of the variable factor which initiates operation of the device. In the embodiments illustrated herein, the variable factor is engine speed which is manifested in the form of relatively low pressures varying as a function of engine speed produced in chamber 72 by blower 15. But these features of my invention are equally valuable in any control mechanism wherein frictionless characteristics are desired in responding to any other variable factor such as torque, pressure, velocity, etc. Actual experience with a governor having this valve construction and mis-alignment of the valve and its seats produced surging and hunting, whereas very stable operation was easily achieved with the anti-torque plate, the elongated hole 55, and the valve secured from rotation by suitable means. These features are particularly valuable in order to build the governors in production.

A conduit 60 provides a communication between the valve chamber 33 and the right hand side of the cylinder 61, wherein there is slidably fitted a piston 62 having a piston rod 63 connected to the metering rack 26. The left-hand side of the cylinder 61 communicates through a conduit 64 with the chamber 34 and houses a compression spring 65 urging the piston 62 to the right. Thus the piston 62 is subjected to forces produced at one side thereof by the pressure existing in the valve chamber 33, and on the opposite side thereof by the forces produced by the pressure existing in the chamber 34 and by the spring 65. As the pressure in the chamber 33 increases, the piston 62 is moved to the left in opposition to the spring 65, whereby the metering rack 26 is moved to increase the fuel discharged by the fuel injector and thus to increase the speed of the engine. Decrease of the pressure in the valve chamber 33 has the opposite effect.

It will now be understood in view of the foregoing that pressure in the chamber 33 is controlled by the movements of the modulator valve 42, and that it varies in magnitude from a pressure equal to that at the discharge side of the circuit (when the valve 42 is in the position designated by the numeral 66 and closes the opening 41) to that at the intake side of the circuit (when the valve 42 is in the position designated by the numeral 67 and closes the valve opening 40). Intermediate positions of the valve 42 produce an infinite number of intermediate or modulated pressures.

It should be also appreciated that the valve portions 43 and 44 aid each other, and as one of them opens a restriction the other operates to close the other restriction thus adding to the effect of opening the first restriction.

In accordance with the invention the desired type of movements of the modulator valve 42 is produced by actuating it with the aid of a relatively large diaphragm 70 made of suitable material, such as synthetic rubber, and having desired characteristics, particularly high sensitivity. By virtue of such actuation there are effected steady but instantaneous responsive movements of the modulator valve free of frictional resistance since the diameter of the diaphragm is large in relation to its short travel. By exposing the diaphragm 70 to the action of the speed-sensing pressure in the air box 16, movements of the modulator valve, as well as the resulting pressures in the valve chamber 33 and movements of the piston 62 and of the metering rack 26 are subjugated in a desirably reliable manner to said sensing pressure and consequently to the speed of the engine.

In the present embodiment of the invention the diaphragm 70 is held at its peripheral edges between the body 36 and a cover casting 71 forming a chamber 72 communicating through a conduit 73 with the air box 16 and thus exposing the left-hand side or surface of the diaphragm to the action of the speed-sensing pressure. At its center, the diaphragm 70 is held between the shoulder of the diaphragm retainer 59 and a nut 74 screwed on the extension of the retainer 59. The diaphragm may be secured to the valve either before or after assembling the valve structure as previously described. If the diaphragm is secured to the valve after installation of the valve assembly, the diaphragm is first inserted in place and the nut 74 is installed and tightened by holding the flat extension of the retainer 59 to prevent rotation thereof and hence undue stresses on leaf spring 51. The flat portion of the extension of retainer 59 which includes a hole for a biasing spring 76, as shown best in Fig. 2, is made small enough that excessive torques cannot be applied to the diaphragm by the nut, thereby preventing overcompression of the diaphragm material; if desired, a washer (not shown) may be inserted between the nut 74 and diaphragm. A substantially frictionless tension spring 76 is provided, said spring having one end connected to the retainer 59 and the other end anchored at a piston 77 slidable in a bore 78. The spring 76 acts on the modulator valve 42 without friction in opposition to the forces produced by the pressure acting on the diaphragm 70, to balance said forces and to establish the required balance at the desired speed of the engine.

Means are provided to adjust the point of such balance and thus to vary selectively the governed speed of the engine. In the present embodiment said means are exemplified by the linkage 80, 81, and 82, fulcrumed as at 83 and operatively connected to an adjusting screw 84. Rotating the screw 84 varies the tension of the spring 76 and thus regulates the governed speed of the engine.

Thus the combination of the substantially frictionless diaphragm 70, the leaf-spring supported modulator valve 42, which is often called a pilot-valve in most servo-mechanisms, and frictionless biasing spring 76 form the "sensing mechanism" previously referred to, which must respond without delay to the minute "sensing" pressures produced by small changes in the blower pressure in box 16 accompanying small changes in engine speed. It has thus been shown that the movements of the sensing mechanism in my governor combination in responding to these minute "sensing" pressures are substantially frictionless.

By virtue of such a construction increase of the speed of the engine, and consequently of pressure in the air box 16 and chamber 72, causes the diaphragm 70 and the valve 42 to move to the right (see Figs. 1 and 3), decreasing the effective area of the valve opening 41 and simultaneously increasing the effective area of the opening 40. Such a condition immediately causes decrease of the pressure in the chamber 33 and the right hand side of the cylinder 61, allowing the spring 65 to move the piston 62 to the right and to actuate the metering rack 26 to decrease the amount of fuel discharged by the fuel injector into the cylinder of the engine. This, in turn, causes decrease in the engine speed and the air pressure in the box 16 to a value at which the system comes to a balanced condition at a certain engine speed. It should be appreciated that pressure in the chamber 34 being, in effect, atmospheric pressure, remains constant. Decrease in the engine speed brings about a reverse operation of the governor.

Figure 4:
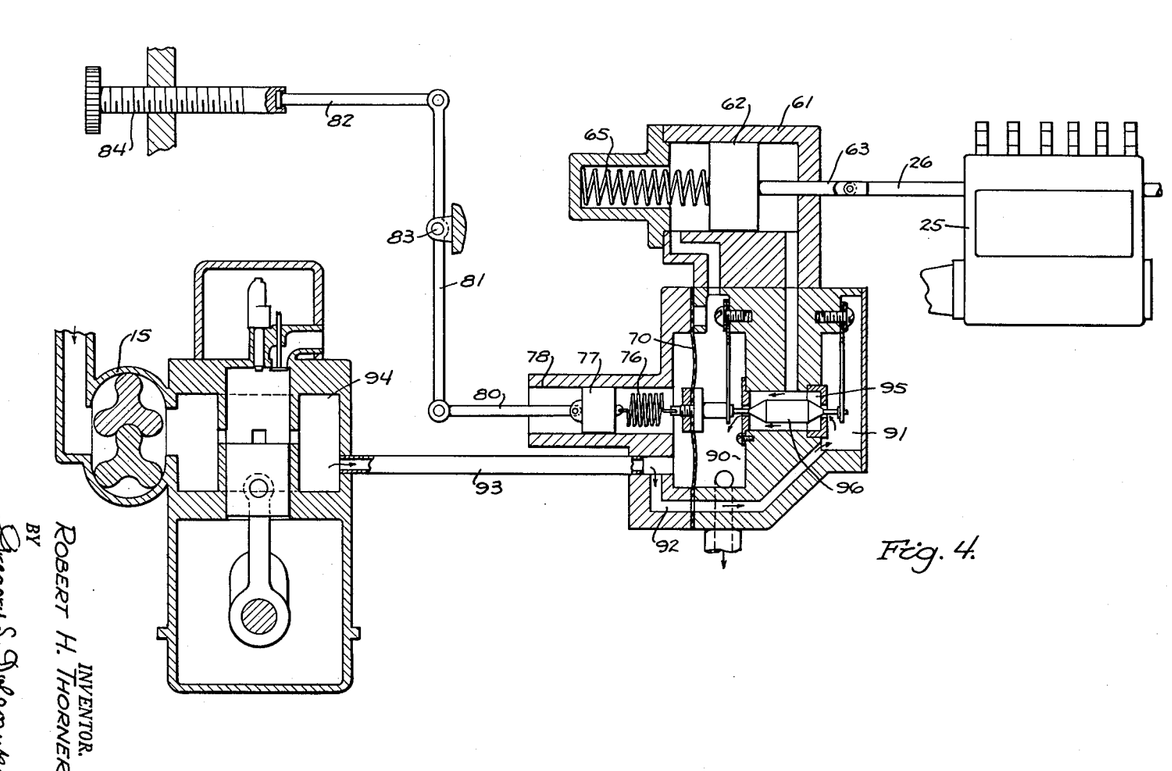
Fig. 4 is a view similar in part to Fig. 1 and illustrating a modified construction of the governor embodying the invention.

The construction illustrated in Fig. 4 is similar to that shown in Figs. 1–3, the main difference being in the fact that in the construction of Fig. 4, the sensing pressure, i. e. the pressure in the air box 16 is utilized to produce the operating fluid pressure actuating the piston 62 or a similar pressure-responsive member. In this construction the chamber 90 is open to the atmosphere, while the chamber 91 is connected with the aid of a passage 92 and a conduit 93 with the air box 94 of the engine. The flow of air from the chamber 91 to the chamber 90 through the control chamber 95 is controlled by the modulator valve 96. In this construction it is particularly important that the conduit 93 is of a sufficient cross section and does not have restrictive effect. In its other particulars of construction and operation the system of Fig. 4 is similar to the system of Figs. 1–3.

It should be appreciated that as the density of the atmospheric air changes, the point of balance of the operative parts of the governor also varies, thus affecting the governed speed of the engine. While the effect of the resulting variations in engine speed is rather small and may be safely disregarded in many applications, my improved governor may, if desired, be provided with means compensating for changes in air density resulting from changes in temperature, altitude, or both. By virtue of such a construction extremely close regulation, unaffected by changes in air density is effected.

Figures 5, 6, 7:
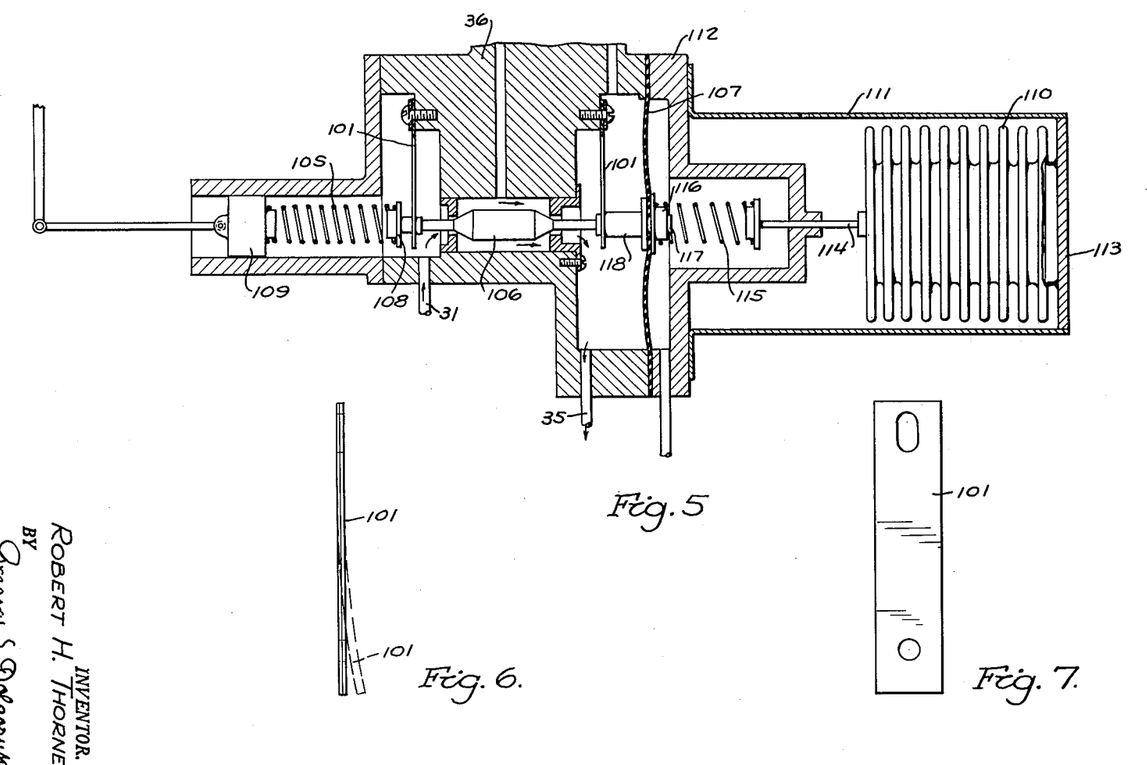
Fig. 5 is a sectional view illustrating a portion of the governor including means compensating for the undesirable effect of the changes in air density produced by changes in temperature or elevation, or both.
Fig. 6 is a side view of the bi-metallic suspension spring for the modulator valve of the construction of Fig. 5.
Fig. 7 is a front view of the suspension spring of Fig. 6.

When changes in density, and hence the "sensing" pressure, are expected to be caused primarily by changes in the ambient temperature, one or both of the suspension springs 101 may be made of bi-metal construction, as illustrated in Figs. 5 and 6. As the ambient temperature increases and the resulting decrease in the air density causes the governor to operate to effect increase in engine speed, the bi-metallic spring tends to bend as illustrated in Fig. 6 in dotted lines. Such tendency causes application of a certain force on the modulator valve toward the left, which condition tends to cause a corresponding decrease in the engine speed, thus compensating for the undesirable effect of the change in air density. Decrease in the ambient temperature causes the bi-metallic spring to affect operation of the governor in a reversed manner.

The above described means may be used with success in ground installation where variations in engine speed caused by the effect of changes in barometric pressure are immaterial. In aircraft and similar installations, where considerable changes in altitude are expected, means illustrated in Fig. 5 may be employed. The diaphragm and valve in Fig. 5 are in a reversed position from that shown in Figs. 1 and 4.

The means illustrated in Fig. 5 take advantage of the fact that a completely evacuated and sealed capsule or bellows is responsive substantially to only the pressure of the surrounding medium, such as the atmosphere. If, however, such a sealed capsule or bellows is partially filled with a gas, such as air or nitrogen, it becomes responsive to the temperature as well as the pressure of the surrounding medium; and the denser the gas inside the bellows or capsule, the more responsive is such a unit to the ambient temperature.

In accordance with the invention, I provide in my device a suitable bellows completely evacuated or partially filled with suitable gas and adapted to act on the modulator valve to affect its operation in such a manner as to compensate for changes in air density produced by changes in altitude or in altitude and temperature, respectively.

One such construction is shown in Fig. 5, wherein a compression spring 105 bears on the left hand end of the modulator valve 106 to oppose the sensing forces produced by the blower and exerted on the valve by the diaphragm 107. A spring retainer 108 slip fits over the end of the stem of the modulator valve 106 to guide one end of the compression spring 105, the piston 109 being manually actuated as in the construction of Figs. 1–4 and for the same purposes. A bellows 110, which may be either completely evacuated or filled with gas as explained above, is operatively arranged in a chamber opened to the atmosphere and formed by a housing 111 secured to the body 112 of the governor. The bellows 110 has one end soldered to the end piece 113 press fit into the end of the housing 111, while a shaft 114 abuts at its other end. A spring 115 which has rate lower than that of the main spring 105 is installed between the diaphragm 107 and the shaft 114. A spring retainer 116 is secured to the diaphragm 107 in any suitable manner such as with the aid of a rivet 117 which abuts against an extension 118 soldered to the modulator valve.

As the bellows expands (or contracts) responding to changes in altitude or in altitude and pressure (depending on whether it is fully evacuated or gas-filled), a slight force is exerted on the modulator valve affecting its operation in a predetermined manner to compensate for the undesirable effects of such changes. By installing the bellows to act directly on the main spring 105, its compensating effect can be made more pronounced.

It should also be appreciated that the bi-metallic suspension spring operates similarly to the gas within the bellows to compensate for temperature changes, and these two expedients may be used either independently for the same purposes, or in a combination to aid each other.

By virtue of the above constructions the objects of the invention listed above, and numerous additional advantages are attained.

I claim:

1. In a governor for an engine having means to produce a charging pressure that varies as a function of the speed of the engine and a control means to regulate the speed of the engine, the combination of means to effect movement of said control means comprising, a pressure responsive member connected to said control means for actuation thereof, a pressure fluid circuit communicating with said pressure responsive member, valve means in said circuit to direct pressure fluid to said pressure responsive member to effect a speed controlling movement of said control member, substantially frictionless swingable means having a width imparting rigidity in one direction acting to support said valve means for substantially frictionless movements in a direction transverse to said first-named direction and for frictionless suspension within the fluid controlled thereby with only fluid contact at the flow controlling surfaces thereof during operational movements, a substantially frictionless second pressure responsive member connected to said valve means for actuation thereof, a passage connecting said second pressure responsive member to said pressure that varies as a function of engine speed, and substantially frictionless biasing means opposing forces produced by said second pressure responsive member as a result of said last named pressure acting thereon, whereby the combined movements of said valve means, said second pressure responsive member and said biasing means are substantially frictionless and thereby respond to minute changes in said pressure that varies as a function of engine speed to effect movement of said first pressure responsive member and cooperating control means to maintain the speed of the engine.

2. The combination of means defined in claim 1 in which said swingable means comprises a pair of spaced leaf spring members.

3. In a governor for an engine having means to produce a charging pressure that varies as a function of the speed of the engine and a control means to regulate the speed of the engine, the combination of means to effect movement of said control means comprising, a pressure responsive member connected to said control means for actuation thereof, a pressure fluid circuit having inlet and outlet orifices communicating with said first pressure responsive member, at least one of said orifices including valve means in said circuit to vary the aperture of one of said orifices whereby to modulate the pressures acting on said first pressure responsive member to effect a speed-controlling movement of said control means, substantially frictionless swingable means having a width imparting rigidity in one direction acting to support said valve means for substantially frictionless movements in a direction transverse to said first-named direction and for frictionless suspension within the fluid controlled thereby with only fluid contact at the flow controlling surfaces thereof during operational movements, a substantially frictionless second pressure responsive member connected to said valve means for actuation thereof, a passage connecting said second pressure responsive member to said pressure that varies as a function of engine speed, and substantially frictionless biasing means opposing forces produced by said second pressure responsive member as a result of said last named pressure acting thereon, whereby the combined movements of said valve means, said second pressure responsive member and said biasing means are substantially frictionless and thereby respond to minute changes in said pressure that varies as a function of engine speed to effect movement of said first pressure responsive member and cooperating control means to maintain the speed of the engine.

4. In a governor for an engine having an intake passage and a charging blower therein driven by the engine that produces a charging air pressure in said passage that varies as a function of the speed of the engine, and a fuel control means to regulate the speed of the engine, the combination of means to effect movement of said fuel control means comprising, a pressure responsive member connected to said control means for actuation thereof, a pressure fluid circuit communicating with said pressure responsive member, valve means in said circuit to direct pressure fluid to said pressure responsive member to effect a speed controlling movement of said control member, substantially frictionless swingable means having a width imparting rigidity in one direction acting to support said valve means for substantially frictionless movements in a direction transverse to said first-named direction and for frictionless suspension within the fluid controlled thereby with only fluid contact at the flow controlling surfaces thereof during operational movements, a substantially frictionless second pressure responsive member connected to said valve means for actuation thereof, a passage connecting said second pressure responsive member to said charging air pressure, and substantially frictionless biasing means opposing forces produced by said second pressure responsive member as a result of said last named pressure acting thereon, whereby the combined movements of said valve means, said second pressure responsive member and said biasing means are substantially frictionless and thereby respond to minute changes in said charging air pressure to effect movement of said first pressure responsive member and cooperating control means to maintain the speed of the engine.

5. In a speed governor for an engine having an intake passage for the flow of air therethrough, said engine including means to produce air pressure in said passage that varies as a function of the speed of the engine and a control means to regulate the speed of the engine, the combination of means to effect movement of said control means comprising, a pressure responsive member connected to said control means for actuation thereof, an air pressure circuit communicating with said passage air pressure and with said pressure responsive member, valve means in said circuit to direct air to said pressure responsive member to effect a speed-controlling movement of said control means, substantially frictionless swingable means disposed to impart rigidity in one direction acting to support said valve means for substantially frictionless movements in a direction transverse to said first-named direction and for frictionless suspension within the air controlled thereby with only air contact at the flow controlling surfaces thereof during operational movements, a substantially frictionless second pressure responsive member connected to said valve means for actuation thereof, said second pressure responsive member communicating with said passage for movements in response to changes in engine speed, and substantially frictionless biasing means opposing forces produced by said second pressure responsive member as a result of said passage air pressure acting thereon, whereby the combined movements of said valve means, said second pressure responsive member, and said biasing means are substantially frictionless and thereby respond to minute changes in said passage air pressure to effect movement of said first pressure responsive member and cooperating control means to maintain the speed of the engine.

6. A control device to operate a movable controlled member in response to changes in a variable factor and having a stationary part comprising, a pressure responsive member for actuating said movable controlled member, a pressure fluid circuit communicating with said pressure responsive member, valve means in said circuit to direct pressure fluid to said pressure responsive member, said valve means including a seating member and a valve body member, a substantially frictionless swingable member having a width imparting rigidity in one direction acting to support one of said valve members for substantially frictionless movements in a direction transverse to said first-named direction and for frictionless suspension within the fluid controlled thereby with only fluid contact at the flow controlling surfaces thereof during operational movements, fastening means to secure said swingable member between said fastening means and said stationary part, said swingable member having sufficient clearance relative to said fastening means for self-aligning seating of said supported valve member in relation to the other of said valve members when said fastening means is tightened, substantially frictionless movable sensing means responsive to said variable factor to exert forces on said valve means as a function of said variable factor, and substantially frictionless biasing means to oppose said forces, whereby the combined movements of said valve means, said sensing means, and said biasing means are substantially frictionless and thereby respond to minute changes in said variable factor to effect movement of said controlled member.

7. A control device to operate a movable controlled member in response to changes in a variable factor and having a stationary part comprising, a pressure responsive member for actuating said movable controlled member, a pressure fluid circuit communicating with said pressure responsive member, valve means in said circuit to direct pressure fluid to said pressure responsive member, said valve means including a seating member and a valve body member, a substantially frictionless swingable member disposed to impart rigidity in one direction acting to support one of said valve members for substantially frictionless movements in a direction transverse to said first-named direction and for frictionless suspension within the fluid controlled thereby with only fluid contact at the flow controlling surfaces thereof during operational movements, threaded fastening means including a head means to secure said swingable member to said stationary part of said device, an anti-torque member between said head and said swingable member and cooperating with said stationary part to prevent the torque of said head from acting on said swingable member when said fastening means is tightened, whereby only thrust forces are applied to said swingable member to maintain alignment of said supported valve member in relation to the other of said valve members, substantially frictionless movable sensing means to exert forces on said valve means as a function of said variable factor, and substantially frictionless biasing means to oppose said forces, whereby the combined movements of said valve means, said sensing means, and said biasing means are substantially frictionless and thereby respond to minute changes in said variable factor to effect movement of said controlled member.

8. A control device to operate a movable controlled member in response to changes in a variable factor and having a stationary part comprising, a pressure responsive member for actuating said movable controlled member, a pressure fluid circuit communicating with said pressure responsive member, valve means in said circuit to direct pressure fluid to said pressure responsive member, said valve means including a seating member and a valve body member, a substantially frictionless swingable member disposed to impart rigidity in one direction acting to support one of said valve members for substantially frictionless movements in a direction transverse to said first-named direction and for frictionless suspension within the fluid controlled thereby with only fluid contact at the flow controlling surfaces thereof during operational movements, threaded fastening means including a head means to secure said swingable member to said stationary part of said device, said swingable member having sufficient clearance relative to said fastening means for self-aligning seating of said supported valve member in relation to the other of said valve members when said fastening means is tightened, an anti-torque member between said head and swingable member and cooperating with said stationary part to prevent the torque of said head from acting on said swingable member when said head is tightened, whereby only thrust forces are applied to said swingable member to maintain alignment of said supported valve member in relation to the other of said valve members, substantially frictionless movable sensing means to exert forces on said valve means as a function of said variable factor, and substantially frictionless biasing means to oppose said forces, whereby the combined movements of said valve means, said sensing means, and said biasing means are substantially frictionless and thereby respond to minute changes in said variable factor to effect movement of said controlled member.

9. A control device to operate a movable controlled member in response to changes in a variable factor and having a stationary part comprising, a pressure responsive member for actuating said movable controlled member, a pressure fluid circuit communicating with said pressure responsive member, valve means in said circuit to direct pressure fluid to said pressure responsive member, said valve means including a seating member and a valve body member, a substantially frictionless swingable member disposed to impart rigidity in one direction acting to support one of said valve members for substantially frictionless movements in a direction transverse to said first-named direction and for frictionless suspension within the fluid controlled thereby with only fluid contact at the flow controlling surfaces thereof during operational movements, said supported valve member being positively secured to said swingable member to prevent rotary movement of said supported valve member whereby alignment of said two valve members are maintained, substantially frictionless movable sensing means to exert forces on said valve means as a function of said variable factor, and substantially frictionless biasing means to oppose said forces, whereby combined movements of said valve means, said sensing means, and said biasing means are substantially frictionless and thereby respond to minute changes in said variable factor to effect movement of said controlled member.

10. A control device to operate a movable controlled member in response to changes in a variable factor and having a stationary part comprising, a pressure responsive member for actuating said movable controlled member, a pressure fluid circuit communicating with said pressure responsive member, valve means in said circuit to direct pressure fluid to said pressure responsive member, said valve means including a seating member and a valve body member, a substantially frictionless swingable member disposed to impart rigidity in one direction acting to support one of said valve members for substantially frictionless movements in a direction transverse to said first-named direction and for frictionless suspension within the fluid controlled thereby with only fluid contact at the flow controlling surfaces thereof during operational movements, fastening means to secure said swingable member between said fastening means and stationary part, said swingable member having sufficient clearance relative to said fastening means for self-aligning seating of said supported valve member in relation to the other of said valve members when said fastening means is tightened, said supported valve member being positively secured to said swingable member to prevent rotary movement of said supported valve member whereby alignment of said two valve members are maintained, substantially frictionless movable sensing means to exert forces on said valve means as a function of said variable factor, and substantially frictionless biasing means to oppose said forces, whereby combined movements of said valve means, said sensing means, and said biasing means are substantially frictionless and thereby respond to minute changes in said variable factor to effect movement of said controlled member.

11. A control device to operate a movable controlled member in response to changes in a variable factor and having a stationary part comprising, a pressure responsive member for actuating said movable controlled member, a pressure fluid circuit communicating with said pressure responsive member, valve means in said circuit to direct pressure fluid to said pressure responsive member, said valve means including a seating member and a valve body member, a substantially frictionless swingable member having a width imparting rigidity in one direction acting to support one of said valve members for substantially frictionless movements in a direction transverse to said first-named direction and for frictionless suspension within the fluid controlled thereby with only fluid contact at the flow controlling surfaces thereof during operational movements, threaded fastening means including a head means to secure said swingable member to said stationary part of said device, said swingable member having sufficient clearance relative to said fastening means for self aligning seating of said supported valve member in relation to the other of said valve members when said fastening means is tightened, an anti-torque member between said head and said swingable member and cooperating with said stationary part to prevent the torque of said head from acting on said swingable member when said fastening means is tightened, whereby only thrust forces are applied to said swingable member to maintain alignment of said supported valve member in relation to the other of said valve members, said supported valve member being positively secured to said swingable member to prevent rotary movement of said supported valve member whereby alignment of said two valve members are maintained, substantially frictionless movable sensing means to exert forces on said valve means as a function of said variable factor, and substantially frictionless biasing means to oppose said forces, whereby the combined movements of said valve means, said sensing means, and said biasing means are substantially frictionless and thereby respond to minute changes in said variable factor to effect movement of said controlled member.

12. In a fluid mechanism having a stationary part and a pressure fluid circuit therein, two orifice seating members in series in said circuit, a valve member having two valve faces to modulate simultaneously the aperture of each of said orifice seating members, respectively, for controlling fluid pressure in said circuit between said two orifice seating members, one of said valve faces increasing the aperture of its said cooperating orifice seating member, while the other of said valve faces decreases the aperture of its said cooperating orifice seating member, two spaced substantially frictionless swingable members disposed to impart rigidity in one direction acting to support said valve member for substantially frictionless movements in a direction transverse to said first-named direction and for frictionless suspension within the fluid controlled thereby with only fluid contact at the flow controlling surfaces thereof during operative movements, separate fastening means to secure each of said swingable members, respectively, between said stationary part and said respective fastening means, each of said swingable members having means to produce clearance relative to its respective fastening means for self aligning seating of each of said valve faces in relation to their respective seating members.

13. In a governor for automatically controlling the speed of an engine having an intake passage and a charging blower therein that produces a charging air pressure that varies as a function of the speed of the engine, and control means to regulate the speed of the engine, the combination of means to effect movement of said control means comprising, a pressure responsive member connected to said control means for actuation thereof, a pressure fluid circuit communicating with said pressure responsive member, valve means in said circuit to direct pressure fluid to said pressure responsive member to effect a speed-controlling movement of said control member, a second pressure responsive member connected to said valve means for actuation thereof, a passage connecting said second pressure responsive member to said charging air pressure, and biasing means opposing the forces produced by said second pressure responsive member as a result of said last named pressure acting thereon.

14. In a self-regulating control mechanism for automatically controlling a variable condition the combination of, control means to regulate said controlled condition, a pressure responsive member connected to said control means for actuation thereof, a fluid circuit having a flow of fluid therethrough and communicating with said pressure responsive member, valve means in said fluid circuit for directing fluid therein to said pressure responsive member for effecting movements thereof, said valve means including a valve body member and a mating member cooperable therewith, a leaf spring member having width imparting rigidity in one direction acting to support one of said valve members for substantially frictionless movements in a direction transverse to said first-named direction and to prevent surface contact of said supported valve member during operational movements thereof, said leaf spring member having only one fixed support in substantially its own plane, substantially frictionless movable sensing means responsive to changes in said controlled condition and acting on said supported valve member to effect movements thereof for producing movements of said pressure responsive member and thereby amplified forces acting on said control means, substantially frictionless biasing means opposing the forces produced by said sensing means, whereby the combined movements of said supported valve member, said movable sensing means, and said biasing means are substantially frictionless and thereby respond substantially instantaneously and consistently to minute changes in the forces produced by changes in said controlled condition acting on said sensing means to effect movement of said control means for maintaining within a predetermined variation a desired value of said controlled condition.

15. The combination of elements defined in claim 14, and said fluid circuit including at least two restrictions, said pressure responsive member communicating with said circuit at a point between said two restrictions, said supported valve member varying the restrictive effect of at least one of said restrictions to modulate the pressures acting on said pressure responsive member.

16. The combination of elements defined in claim 14, and a second leaf spring member similar and substantially parallel to said first leaf spring member to assist in supporting said supported valve member, said second leaf spring member also having only one fixed support in substantially its own plane, variable force second biasing means acting on said pressure responsive member to oppose the forces produced thereon by fluid pressures in said fluid circuit acting on said pressure responsive member, the force of said last-named biasing means varying as a function of the movement of said pressure responsive member, said valve means controlling pressures on only one side of said pressure responsive member, the configuration of said valve body member in relation to the said mating member adapted to produce modulated pressures acting on said pressure responsive member to effect movement thereof as a function of the movement of said supported valve member, and the force of said frictionless biasing means varying as a function of the movement of said supported valve member, whereby the movement of said valve means varies as a function of said controlled condition to effect corresponding movement of said control means also as a function of said controlled condition.

17. In a governor for automatically controlling the speed of an engine comprising in combination, control means to regulate the speed of the engine, a pressure responsive member connected to said control means for actuation thereof, a fluid circuit having a flow of fluid therethrough and communicating with said pressure responsive member, valve means in said fluid circuit for directing fluid therein to said pressure responsive member to effect movement thereof, said valve means including a valve body member and a mating member cooperable therewith, substantially frictionless swingable means disposed to impart rigidity in one direction acting to support one of said valve members for substantially frictionless movements in a direction transverse to said first-named direction and to prevent surface contact of said supported valve member during said operational movements thereof, substantially frictionless movable sensing means responsive to changes in engine speed and acting on said supported valve member to effect movements thereof for producing movements of said pressure responsive member and thereby amplified forces acting on said control means, substantially frictionless biasing means opposing the forces produced by said sensing means, whereby the combined movements of said supported valve member, said movable sensing means, and said biasing means are substantially frictionless and thereby respond substantially instantaneously and consistently to minute changes in the forces produced by changes in engine speed acting on said sensing means to effect speed-controlling movements of said control means for maintaining within a predetermined variation a desired value of engine speed.

18. The combination of elements defined in claim 17, and said fluid circuit including at least two restrictions, said pressure responsive member communicating with said circuit at a point between said two restrictions, said supported valve member varying the restrictive effect of at least one of said restrictions to modulate the pressures acting on said pressure responsive member.

19. The combination of elements defined in claim 17, variable force second biasing means acting on said pressure responsive member to oppose the forces produced thereon by fluid pressures in said fluid circuit acting on said pressure responsive member, the force of said last-named biasing means varying as a function of the movement of said pressure responsive member, said valve means controlling pressures on only one side of said pressure responsive member, the configuration of said valve body member in relation to the said mating member adapted to produce modulated pressures acting on said pressure responsive member to effect movement thereof as a function of the movement of said supported valve member, and the force of said frictionless biasing means varying as a function of the movement of said supported valve member, whereby the movement of said supported valve member varies as a function of engine speed to effect corresponding movement of said control means also as a function of engine speed.

20. The combination of elements defined in claim 17, and said fluid circuit communicating with only one side of said pressure responsive member, at least two restrictions in said circuit, said communication of said pressure responsive member with said circuit being at a point between said two restrictions, variable force second biasing means acting on said pressure responsive member to oppose the forces produced thereon by fluid pressures in said fluid circuit acting on said pressure responsive member, the force of said last-named biasing means varying as a function of the movement of said pressure responsive member, said supported valve member being disposed to vary the restrictive effect of at least one of said restrictions to modulate the pressures acting on said pressure responsive member to effect movement thereof as a function of the movement of said supported valve member, and the force of said frictionless biasing means varying as a function of the movement of said supported valve member, whereby the movement of said supported valve member varies as a function of engine speed to effect corresponding movement of said control means also as a function of engine speed.

21. The combination of elements defined in claim 17, wherein said swingable means comprises at least one leaf spring member, each leaf spring member having only one fixed support in substantially its own plane, variable force second biasing means acting on said pressure responsive member to oppose the forces produced thereon by fluid pressures in said fluid circuit acting on said pressure responsive member, the force of said last-named biasing means varying as a function of the movement of said pressure responsive member, said valve means controlling pressures on only one side of said pressure responsive member, the configuration of said valve body member in relation to the said mating member adapted to produce modulated pressures acting on said pressure responsive member to effect movement thereof as a function of the movement of said supported valve member, and the force of said frictionless biasing means varying as a function of the movement of said supported valve member, whereby the movement of said supported valve member varies as a function of engine speed to effect corresponding movement of said control means also as a function of engine speed.

22. In a governor for automatically controlling the speed of an engine comprising in combination, control means to regulate the speed of the engine, a pressure responsive member connected to said control means for actuation thereof, a fluid circuit having a flow of fluid therethrough and communicating with said pressure responsive member, valve means in said fluid circuit for directing fluid therein to said pressure responsive member to effect movement thereof, said valve means including a valve body member and a mating member cooperable therewith, two substantially parallel leaf spring members each having width imparting rigidity in one direction acting to support one of said valve members for substantially frictionless movements in a direction transverse to said first-named direction and to prevent surface contact of said supported valve member during said operational movements thereof, each of said leaf spring members having only one fixed support in substantially its own plane, substantially frictionless movable sensing means responsive to changes in engine speed and acting on said supported valve member to effect movements thereof for producing movements of said pressure responsive member and thereby amplified forces acting on said control means, substantially frictionless biasing means opposing the forces produced by said sensing means, whereby the combined movements of said supported valve member, said movable sensing means, and said biasing means are substantially frictionless and thereby respond substantially instantaneously and consistently to minute changes in the forces produced by changes in engine speed acting on said sensing means to effect speed-controlling movements of said control means for maintaining within a predetermined variation a desired value of engine speed.

23. In a fluid mechanism having a stationary part and a pressure fluid circuit therein, valve means in said fluid circuit for controlling pressures therein, said valve means including a seating member and a valve body member, a leaf spring member acting to support one of said valve members for substantially frictionless movements in a direction transverse to the plane of said leaf spring member and to prevent surface contact of said supported valve member during operational movements thereof, threaded fastening means including a head means to secure said leaf spring member to said stationary part, an antitorque member between said head means and said leaf spring member and cooperating with said stationary part to prevent the torque of said head means from acting on said leaf spring member when said fastening means is tightened, whereby only thrust forces are applied to said leaf spring member to maintain alignment of said supported valve member in relation to the other of said valve members.

24. In a fluid mechanism having a stationary part and a pressure fluid circuit therein, valve means including two orifice members in series in said circuit, said valve means also including two valve members connected together to modulate simultaneously the aperture of each of said orifice members, respectively, for controlling fluid pressure in said circuit between said two orifice members, one of said valve members increasing the aperture of its said cooperating orifice member while the other of said valve members decreases the aperture of its said cooperating orifice member, two spaced substantially parallel swingable leaf spring members having width imparting rigidity in one direction acting to support said valve members for substantially frictionless movements in a direction transverse to said first named direction and to suspend said valve members within the fluid controlled thereby with only fluid contact at the flow controlling surfaces thereof during operational movements; each of said leaf spring members having separate threaded fastening means including a head means to secure said leaf spring member to said stationary part of said device, each of said leaf spring members including aperture means to produce sufficient clearance relative to said fastening means for self-aligning seating of said respective supported valve member in relation to the said corresponding orifice member when said fastening means is tightened, an antitorque member between said head means and each of said leaf spring members and cooperating with said stationary part to prevent the torque of said head means from acting on said respective leaf spring member as said head means is drawn tight to fasten said leaf spring member in adjusted position, whereby only thrust forces are applied to each of said leaf spring members to maintain alignment of said supported valve members in relation to the corresponding orifice members.

25. In a fluid mechanism having a stationary part and a pressure fluid circuit therein, valve means in said fluid circuit for controlling pressures therein, said valve means including a seating member and a valve body member, a leaf spring member acting to support one of said valve members for substantially frictionless movements in a direction transverse to the plane of said leaf spring member and to prevent surface contact of said supported valve member during operational movements thereof, threaded fastening means including a head means to secure said leaf spring member to said stationary part, said leaf spring member having sufficient clearance relative to said fastening means for self-alignment seating of said supported valve member in relation to the other of said valve members when said fastening means is tightened, an anti-torque member between said head means and said leaf spring member and cooperating with said stationary part to prevent the torque of said head means from acting on said leaf spring member when said fastening means is tightened, whereby only thrust forces are applied to said leaf spring member to maintain alignment of said supported valve member in relation to the other of said valve members.

26. In a fluid mechanism having a stationary part and a pressure fluid circuit therein, valve means in said fluid circuit for controlling pressures therein, said valve means including a seating member and a valve body member, a leaf spring member acting to support one of said valve members for substantially frictionless movements in a direction transverse to the plane of said leaf spring member and to prevent surface contact of said supported valve member during operational movements thereof, fastening means to secure said leaf spring member between said stationary part and said fastening means, one of said valve members having a diverging valve face contour and being disposed in relation to the other of said valve members for guiding said supported valve member into self-alignment seating relationship with the other of said valve members before said fastening means is tightened, and said leaf spring member having means to provide sufficient clearance relative to said fastening means to facilitate said self-alignment seating of said supported valve member in relation to the other of said valve members when said fastening means is tightened.

27. The combination of means defined in claim 14, and fastening means to secure said swingable means between a stationary part in said mechanism and said fastening means, and means to effect self-alignment seating of said supported valve member in relation to the other of said valve members when said fastening means is tightened.

28. The combination of elements defined in claim 14, and said fluid circuit including at least two restrictions, said pressure responsive member communicating with said circuit at a point between said two restrictions, said supported valve member varying the restrictive effect of at least one of said restrictions to modulate the pressures acting on said pressure responsive member, and fastening means to secure said leaf spring member between a stationary part in said mechanism and said fastening means, one of said valve members having a diverging valve face contour and being disposed in relation to the other said valve member for guiding said supported valve member into said self aligning seating relationship with said non-supported valve member before said fastening means is tightened, and said leaf spring member being disposed to provide sufficient clearance relative to said fastening means to facilitate self-alignment seating of said supported valve member in relation to said non-supported valve member when said fastening means is tightened.

29. The combination of means defined in claim 17, and said swingable means includes a leaf spring member, and threaded fastening means including a head means to secure said leaf spring member to a stationary part in said governor, said leaf spring member having sufficient clearance relative to said fastening means for self-alignment seating of said supported valve member in relation to the said non-supported valve member when said fastening means is tightened, and one of said valve members having a diverging valve face contour and being disposed in relation to the other of said valve members for guiding said supported valve member into said self-aligning seating relationship with said non-supported valve member before said fastening means is tightened, and the said other of said valve members being contoured to produce substantially a line contact in relation to said valve member having a diverging face upon the seating thereof, and said valve means including a second similarly arranged valve body member cooperating with a similarly arranged second mating member, a second leaf spring member disposed substantially parallel to said first leaf spring member for supporting one of said second valve members, said two supported valve members being connected together for simultaneous movements to increase the aperture between the said first mating member and said first valve body member while simultaneously decreasing the aperture between said second mating member and said second valve body member, and second similarly arranged fastening means, and said second leaf spring member having sufficient clearance for self-alignment seating of said second supported valve member, one of said second valve members having a similarly diverging valve face contour and the other of said second valve members being similarly contoured to provide substantially line contact seating thereof, and said pressure responsive member communicating with said fluid circuit at a point between said two non-supported valve members.

30. The combination of means defined in claim 17, in which said engine includes an intake passage for the flow of air therethrough, and said fluid circuit communicates with said intake passage for effecting a flow of air through said circuit, said air circuit including at least two restrictions formed by said valve means, said first pressure responsive member communicating with said circuit at a point between said two restrictions, said supported valve member varying simultaneously the restrictive effect of both of said restrictions for modulating the pressures acting on said pressure responsive member between the value of pressure at the inlet of said circuit to the value of pressure at the outlet of said circuit.

31. The combination of means defined in claim 1, and variable force second biasing means acting on said first pressure responsive member to oppose the forces produced thereon by fluid pressure in said fluid circuit acting on said first pressure responsive member, the force of said second biasing means varying as a function of the movement of said first pressure responsive member, said valve means being disposed to control pressures on only one side of said first pressure responsive members, the configuration of said valve means being disposed to produce modulated pressures acting on said first pressure responsive member to effect movement thereof as a function of the movement of said valve means, and the force of said frictionless biasing means varying as a function of the movement of said valve means, whereby the movement of said valve means varies as a function of engine speed to effect corresponding movement of said control means also as a function of engine speed.

32. The combination of means defined in claim 24, and one of said supported valve members and its cooperable orifice member being so arranged in relation to each other that at least one of said last-named two members includes a diverging valve face contour and being disposed in relation to the other of said last-named two members for guiding said supported valve member into self-alignment seating relationship with said corresponding orifice member before said corresponding fastening means is tightened, and the second supported valve member and its corresponding orifice member being similarly arranged to provide self-aligning seating thereof.

33. In a governor for automatically controlling the speed of a rotating machine, comprising in combination, control means to regulate the speed of the machine, a pressure responsive member connected to said control means for actuation thereof, a fluid circuit having a flow of fluid therethrough and communicating with said pressure responsive member, valve means in said fluid circuit for directing fluid therein to said pressure responsive member to effect speed-controlling movements of said control means to maintain the speed of said machine, sensing means responsive to changes in the speed of said machine connected to said valve means for effecting movement thereof, and leaf spring means having width imparting rigidity in the direction of its own plane connected to said valve means to support same for substantially frictionless movements in a direction transverse to said first direction and for frictionless suspension within the fluid controlled thereby with only fluid contact at the flow controlling surfaces of said valve means during operational movements thereof.

34. In a governor for an engine having an intake passage for the flow of air therethrough, said engine including means causing the pressure of at least a portion of said intake-passage-air to vary as a function of engine speed, control means to regulate engine speed, the combination of a fluid device connected to said control means for actuation thereof, said device including a pressure-responsive member communicating with said speed-varying intake-passage air-pressure for effecting movements thereof in response to speed-effected changes in said air pressure to produce speed-controlling movements of said control means, a sealed expansible member movable in response to changes in the absolute value of substantially atmospheric air pressure disposed to control forces acting on said pressure responsive member to compensate for undesirable changes in said speed-varying air pressure acting thereon produced by changes in the density of said air flowing through said intake passage as the altitude is changed.

35. In a governor for an engine having an intake passage for the flow of air therethrough, said engine including means causing the pressure of at least a portion of said intake-passage-air to vary as a function of engine speed, control means to regulate engine speed, the combination of means to effect speed-regulating movements of said control means comprising, a pressure responsive member connected to said control means for actuation thereof, a fluid circuit having a flow of fluid therethrough and communicating with said pressure responsive member, valve means in said circuit to control pressure therein acting on said pressure responsive member to effect speed-controlling movements of said control means, a second pressure responsive member connected to said valve means for actuation thereof, said second pressure responsive member communicating with said speed-varying intake-passage air-pressure for effecting movements thereof in response to changes in engine speed, an expansible member having a sealed reference chamber on one side thereof with the other side thereof being exposed to a region of air pressure corresponding to substantially atmospheric pressure to effect movements of said expansible member as a function of changes in the absolute value of said region-air-pressure, said expansible member being so arranged in relation to said valve means that said movements of said expansible member produces forces varying as a function of said absolute value of said region-air-pressure to affect operation of said valve means to compensate for undesirable changes in said speed-varying intake-passage air-pressure acting on said second pressure responsive member produced by changes in the density of said air flowing through said intake passage as the altitude is changed.

36. In a governor for controlling the speed of an engine having an intake passage for the flow of air therethrough, said engine including means causing the pressure of at least a portion of said intake-passage-air to vary as a function of engine speed, control means to regulate engine speed, a pressure responsive member connected to said control means for actuation thereof, a fluid circuit having a flow of fluid therethrough and communicating with said pressure responsive member, valve means in said fluid circuit for directing fluid therein to said pressure responsive member to effect movement thereof, said valve means including a valve body member and a mating member cooperable therewith, substantially frictionless swingable means disposed to impart rigidity in one direction acting to support one of said valve members for substantially frictionless movements in a direction transverse to said first-named direction and to prevent surface contact of said supported valve member during said operational movements thereof, a second pressure responsive member connected to said supported valve member for actuation thereof, biasing means opposing the forces produced by said second pressure responsive member, said second pressure responsive member communicating with said speed-varying intake-passage air-pressure for effecting movements thereof and cooperating said supported valve member in response to changes in engine speed to produce speed-controlling movements of said first-named pressure responsive member and cooperable control means.

37. In a governor for controlling the speed of an engine including means to control the speed of the engine and means driven by the engine and rotating as a function of engine speed to blow air, the combination of means to effect speed-controlling movements of said control means comprising, a pressure responsive member connected to said control means for actuation thereof, a fluid circuit having a flow of fluid therethrough and communicating with said pressure responsive member, valve means in said fluid circuit for directing fluid therein to said pressure responsive member to effect movement thereof, said valve means including a valve body member and a mating member cooperable therewith, substantially frictionless swingable means disposed to impart rigidity in one direction acting to support one of said valve members for substantially frictionless movements in a direction transverse to said first-named direction and to prevent surface contact of said supported valve member during said operational movements thereof, a second pressure responsive member connected to said supported valve member for actuation thereof, biasing means opposing the forces produced by said second pressure responsive member, means connecting said second pressure responsive member with air blown by said air blowing means to produce a pneumatic pressure acting on said second pressure responsive member varying as a function of engine speed for effecting movements thereof and of said supported valve member in response to changes in engine speed to produce said speed-controlling movements of said first-named pressure responsive member and cooperable control means.

References Cited in the file of this patent

UNITED STATES PATENTS

| Number | Name | Date |
|---|---|---|
| 220,202 | Wilder | Sept. 30, 1879 |
| 1,176,203 | Comer | Mar. 21, 1916 |
| 1,887,322 | Nettleton | Nov. 8, 1932 |
| 2,047,581 | Grissett | July 14, 1936 |
| 2,179,628 | Heinzelmann | Nov. 14, 1939 |
| 2,205,354 | Gregg et al. | June 18, 1940 |
| 2,248,780 | Pierce | July 8, 1941 |
| 2,273,670 | Udale | Feb. 17, 1942 |
| 2,279,048 | Kittler et al. | Apr. 7, 1942 |
| 2,343,718 | Udale | Mar. 7, 1944 |
| 2,374,411 | Cammer | Apr. 24, 1945 |
| 2,408,799 | Melichar | Oct. 8, 1946 |
| 2,432,664 | Hobbs | Dec. 16, 1947 |
| 2,445,505 | Ashton | July 20, 1948 |
| 2,453,377 | Lozivit | Nov. 9, 1948 |